(No Model.)
C. C. JEROME.
DEVICE FOR REGULATING GAIT OF HORSES.
No. 589,564. Patented Sept. 7, 1897.
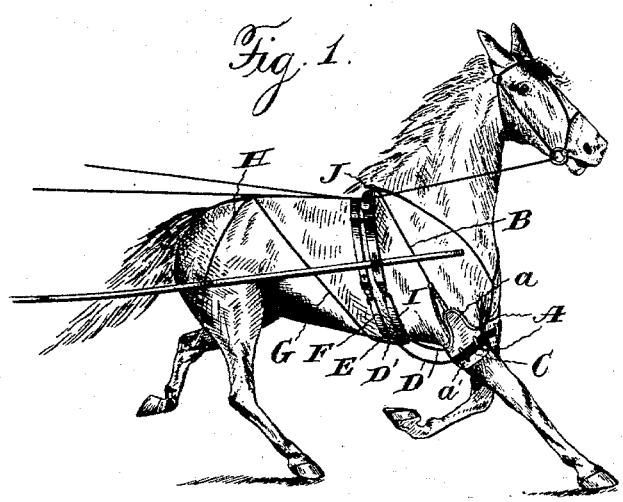
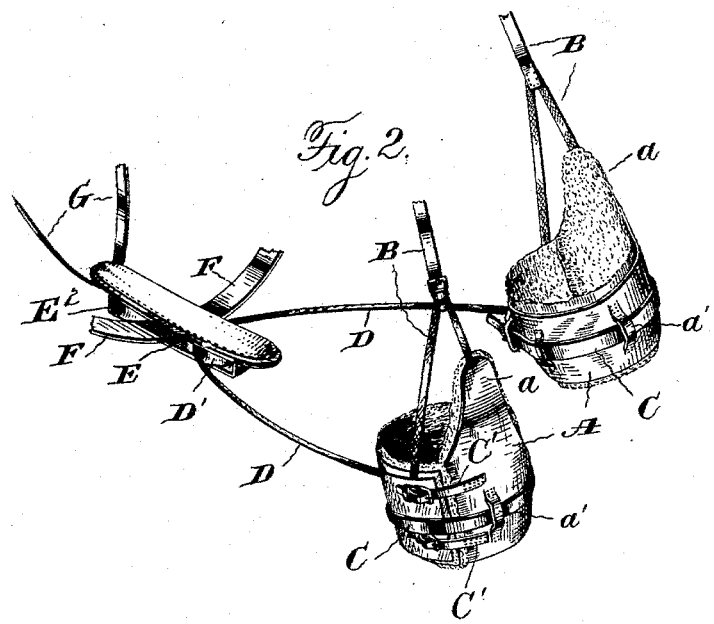
Witnesses
Jas. E. Hutchinson.
G. F. Downing.
Inventor
Chas. C. Jerome,
By H. A. Seymour, Attorney

UNITED STATES PATENT OFFICE.

CHARLES C. JEROME, OF CHICAGO, ILLINOIS.

DEVICE FOR REGULATING GAIT OF HORSES.

SPECIFICATION forming part of Letters Patent No. 589,564, dated September 7, 1897.

Application filed May 5, 1896. Serial No. 590,361. (No model.)

*To all whom it may concern:*

Be it known that I, CHARLES C. JEROME, a resident of Chicago, in the county of Cook and State of Illinois, have invented certain new and useful Improvements in Devices for Regulating the Gait of Horses; and I do hereby declare the following to be a full, clear, and exact description of the invention, such as will enable others skilled in the art to which it appertains to make and use the same.

My invention relates to an improvement in devices for regulating the gait of horses, the object of the invention being to regulate the stride of the forward feet of the horse, so that in the event he attempts to make a longer stride with one leg than the other he is absolutely prevented from doing so.

My invention consists in the parts and combinations of parts, as will be more fully described, and pointed out in the claims.

In the accompanying drawings, Figure 1 is a view in perspective of my improved equalizer attached to a horse, and Fig. 2 is a view of the equalizer.

A represents the boots, adapted to fit the front legs of a horse well up to the body. Each boot is provided on its upper edge with an upwardly-extending tongue $a$, and the two boots are maintained in proper position by the strap B, which latter passes over the shoulders of the animal and is bifurcated at its ends, one section of each bifurcated end being attached to the upwardly-projecting tongue, while the other section is attached to the boot near the free end of the latter. The boots are each adjusted and secured around the legs by the straps C'.

The straps C, which embrace the boots, are preferably loosely supported in loops $a'$, carried by the boots, and each strap is connected to one end of a cord D, which latter passes around an antifriction-pulley D', mounted in the frame E. This frame E is secured against the under side of the body of the horse by the girth F, and is retained against forward movement by the straps G, which latter are secured to the rear end of the frame E and pass, one on each side, upwardly and rearwardly, and are attached at their rear end to the hip-strap H. By this arrangement the frame carrying the pulley is prevented from being drawn forward in the event the horse makes a break and goes against both boots at the same time. The frame E is also provided at its rear end with an antifriction-roller $E^2$, around which a cord can be passed to connect by straps and buckles with ordinary hopples attached to the rear legs of the horse.

To prevent the frame E from being drawn rearwardly where rear equalizers are needed, as above explained, I attach strap I to the forward end of the frame E and carry the looped end around the neck of the horse and connect it to the water-hook J. The cord D, which connects the front boots, is slightly longer (about two inches) than the ordinary stride of the horse, so that when the horse is going at his full speed the cord does not interfere in the slightest with the free movement of his legs.

When in this apparatus or harness, a horse can walk, trot, or pace just as well as without it, as its function comes into play only when the horse attempts to leave his feet and run. When the horse attempts to leave his feet, instead of being thrown on his head, as is frequently the case where the ordinary hopples are used, he finds it impossible to do so and gets back to his gait again, and a few such futile attempts generally break him of the habit.

This device or equalizer is not designed to make a trotting horse pace or a pacing horse trot, but is simply designed to limit the stride of the front feet while either pacing or trotting, and so long as he maintains an even stride he is not restrained by the boots; but when he attempts to jump or attempts to make a longer stride with one leg than the other he is restrained by the boots and is compelled to straighten up and go level.

With the ordinary hopples the front and hind legs of a horse are tied together, and, while they are effective in preventing him from breaking, they do not prevent him from going longer on one side than the other. With my equalizer there is no inconvenience or strain on the body or legs of the animal so long as he maintains an even gait and regular stride. When, however, the horse leaves his feet, the slack in the cord connecting the boots is taken up and the attempted movements automatically restrained, as he only has one-half the length of cord when trying to put both legs forward at one time as he does when running.

Having fully described my invention, what I claim as new, and desire to secure by Letters Patent, is—

1. In an equalizer for preventing horses from leaving their feet, the combination with boots, of a cord connecting the boots and a guide adapted to be secured against the under side of the body and held against forward movement, substantially as set forth.

2. In an equalizer for preventing horses from leaving their feet, the combination with boots, and a strap connecting the boots and adapted to pass over the shoulders of the horse, of a guide adapted to be secured against the under side of the body and held against forward movement, and a cord connecting the boots and passing through the stationary guide.

3. In an equalizer for preventing horses from leaving their feet, the combination with boots, and a strap connecting the boots and adapted to pass over the shoulders of the horse, of a frame adapted to be secured to the horse against movement, a pulley mounted in said frame and a cord connecting the boots and passing around the pulley.

4. In an equalizer for preventing horses from leaving their feet, the combination with the boots, straps secured to the boots, and a strap connecting the boots and adapted to pass over the shoulders of the horse, of a frame adapted to be secured to the horse against movement, a pulley mounted in said frame and a cord attached at its ends to the straps secured to the boots, and passing around the pulley, substantially as set forth.

In testimony whereof I have signed this specification in the presence of two subscribing witnesses.

CHARLES C. JEROME.

Witnesses:
GEO. C. JEROME,
A. B. ELLIOTT.